(12) United States Patent
Kunst et al.

(10) Patent No.: US 6,934,470 B1
(45) Date of Patent: Aug. 23, 2005

(54) MEASUREMENT OF OPTICAL POWER IN OPTICAL FIBER NETWORKS

(75) Inventors: David J. Kunst, Cupertino, CA (US); Steven A. Martinez, Redwood City, CA (US); Farhood Moraveji, Saratoga, CA (US)

(73) Assignee: Micrel, Incorporated, San Jose, CA (US)

( * ) Notice: Subject to any disclaimer, the term of this patent is extended or adjusted under 35 U.S.C. 154(b) by 637 days.

(21) Appl. No.: 10/029,693

(22) Filed: Dec. 20, 2001

(51) Int. Cl.[7] .............................................. H04B 10/08
(52) U.S. Cl. ........................... 398/38; 398/25; 398/208
(58) Field of Search ............................ 398/38, 25, 208, 398/26, 136; 327/350

(56) References Cited

U.S. PATENT DOCUMENTS 3,700,918 A * 10/1972 Kawashima ................. 327/350
4,891,603 A * 1/1990 Oda ............................. 330/110
5,286,969 A * 2/1994 Roberts .................. 250/214 A

* cited by examiner

*Primary Examiner*—Jason Chan
*Assistant Examiner*—Christina Y Leung
(74) *Attorney, Agent, or Firm*—Bever, Hoffman & Harms, LLP (57) ABSTRACT

Systems and methods for the measurement of optical power in optical fiber are disclosed. The optical signal is converted to an electrical signal, which is then converted to a digital output code that indicates the relative strength of the optical signal in terms of logarithmic units.

10 Claims, 6 Drawing Sheets

MEASUREMENT OF OPTICAL POWER IN OPTICAL FIBER NETWORKS

BACKGROUND OF THE INVENTION

1. Field of the Invention

The present invention relates generally to optical fiber and, more particularly, to the measurement of optical power.

2. Related Art

Optical fiber cables and networks are well known in the art and generally employ optoelectric circuits. These circuits convert an electrical signal to an optical signal (e.g., an optical transmitter) or convert an optical signal to an electrical signal (e.g., an optical receiver).

Figure 1:
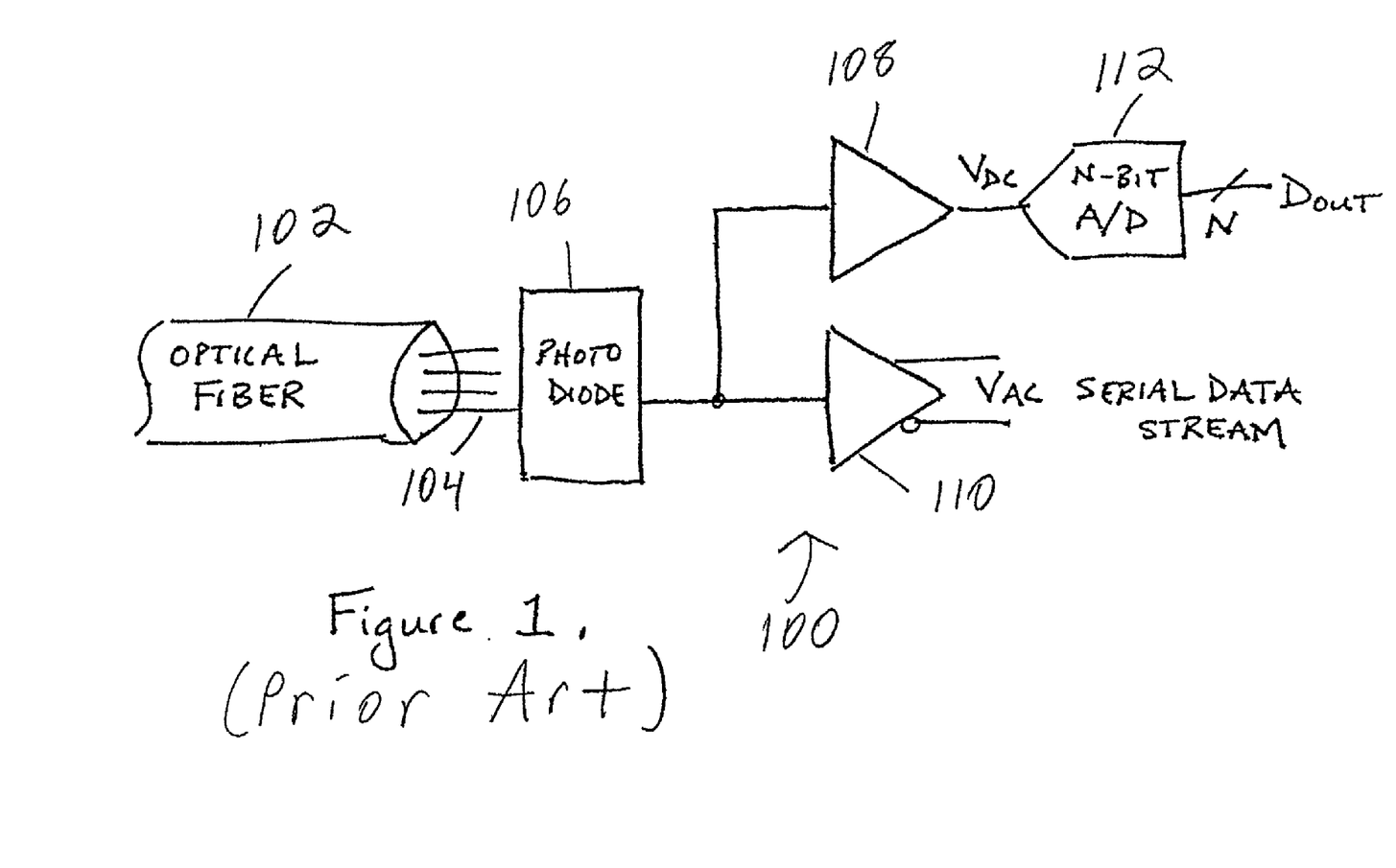
FIG. 1 shows a conventional fiber optics receiver circuit.

For example, FIG. 1 shows a conventional fiber optics receiver 100 that includes a photodiode 106, amplifiers 108 and 110 (e.g., operational amplifiers), and an N-bit analog-to-digital (A/D) converter 112. Photodiode 106, coupled to an optical fiber 102, converts an optical signal 104 into electrical signals. Amplifiers 108 and 110 receive the electrical signals from photodiode 106 and provide a direct current voltage signal ($V_{DC}$) and an alternating current serial data stream ($V_{AC}$), respectively. The direct current voltage signal ($V_{DC}$) is proportional to the average optical power received by photodiode 106 and is converted by A/D converter 112 into a digital output code ($D_{OUT}$) of N-bits that is also proportional to the received optical power.

In a typical application, A/D converter 112 is required to provide the digital output code ($D_{OUT}$) for received optical power over a 40 dBm range, such as from 1 $\mu$W to 10 mW for example. Consequently, A/D converter 112 must provide a 14-bit (i.e., N equals 14) result to resolve one part in ten thousand to support the four orders of magnitude of dynamic range. However, the accuracy required is typically only one percent, which normally implies a 7-bit result. Therefore, at the upper end of the measurement range, the seven least significant bits (LSB) of the 14-bit result are not required. At the lower end of the measurement range and assuming A/D converter 112 provides 14 bits with an accuracy of +/-0.5 LSB, it can be shown that the measurement error is approximately thirty percent. As a result, there is a need for an improved system and method for measuring optical power.

BRIEF SUMMARY OF THE INVENTION

Systems and methods for the measurement of optical power in optical fiber networks are disclosed herein. In an exemplary application, optical power in a fiber optic cable is measured and converted to a logarithmic digital result. For example, a linear-to-logarithmic conversion may be performed utilizing a logarithmic relationship between a transistor's base-emitter voltage and the transistor's collector current.

In accordance with one embodiment of the present invention, a receiver includes a photodiode that translates an optical signal into an electrical signal and a first amplifier, coupled to the photodiode, that receives the electrical signal and provides a first signal. A converter, coupled to the first amplifier, performs a linear-to-logarithmic conversion of the first signal to provide an output signal and an analog-to-digital converter converts the output signal to a digital output signal.

In accordance with another embodiment of the present invention, a method of measuring optical power includes receiving an optical signal; converting the optical signal to an electrical signal; and performing a linear-to-logarithmic conversion on the electrical signal to provide an output signal.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

The preferred embodiments of the present invention and their advantages are best understood by referring to the detailed description that follows. It should be appreciated that like reference numerals are used to identify like elements illustrated in one or more of the figures.

DETAILED DESCRIPTION OF THE INVENTION

Figure 2:
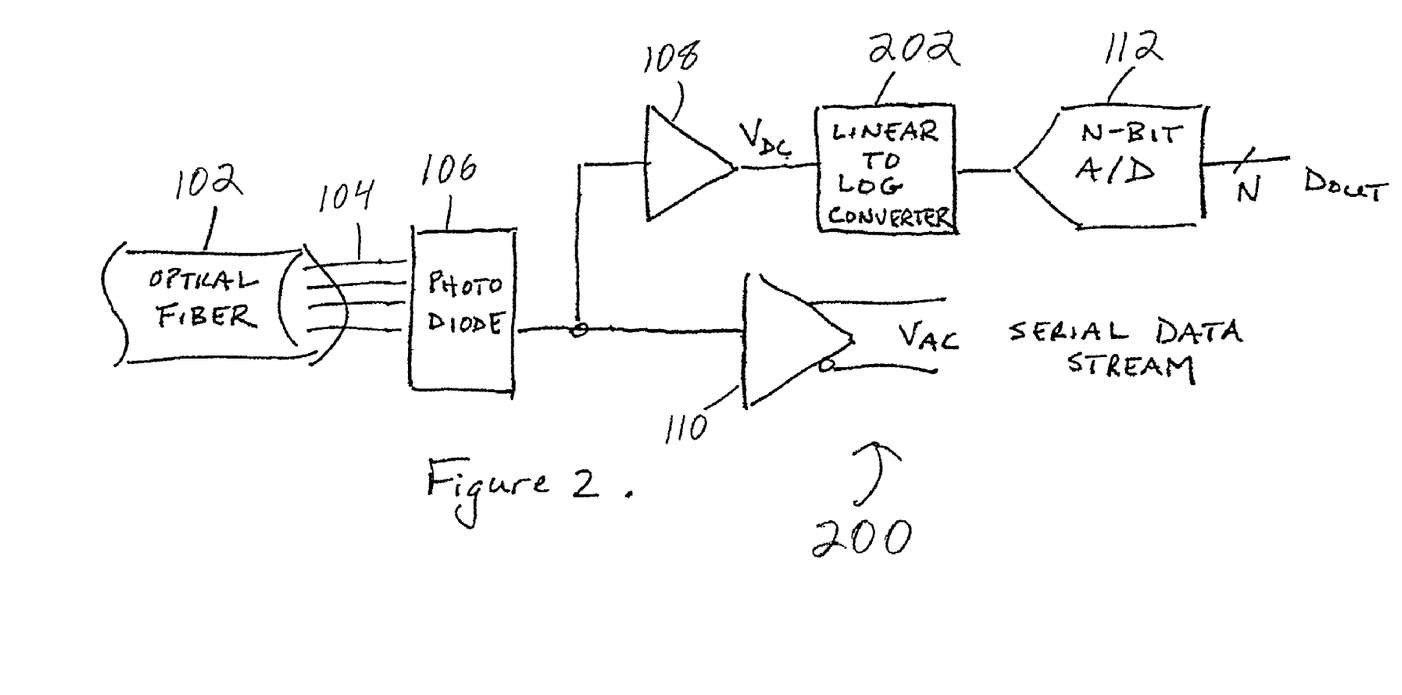
FIG. 2 shows a fiber optics receiver circuit in accordance with an embodiment of the present invention.

FIG. 2 shows a fiber optics receiver circuit 200 in accordance with an embodiment of the present invention. Fiber optics receiver circuit 200 includes photodiode 106, amplifiers 108 and 110, a linear-to-logarithmic voltage converter 202, and A/D converter 112. As explained above in reference to FIG. 1, photodiode 106, coupled to optical fiber 102, converts optical signal 104 into electrical signals which are received by amplifiers 108 and 110 to provide the direct current voltage signal ($V_{DC}$) and the alternating current serial data stream ($V_{AC}$), respectively.

Amplifier 108 can be an operational amplifier, as shown in FIG. 2, or any other type of circuit that operates as a direct current (DC) restoration circuit. For example, amplifier 108 could represent a resistor in parallel with a capacitor, a current mirror in combination with a resistor, or any other type of circuit that can convert the current from photodiode 106 into a voltage level for linear-to-logarithmic voltage converter 202.

As shown in FIG. 2, linear-to-logarithmic voltage converter 202 is inserted between amplifier 108 and A/D converter 112. Linear-to-logarithmic voltage converter 202 performs a linear-to-logarithmic voltage conversion of the direct current voltage signal ($V_{DC}$) (i.e., the restored DC voltage) prior to A/D conversion by A/D converter 112. Consequently, A/D converter 112 reports the relative strength of the received optical power signal of optical signal 104, for example in units of dBm, which is more practical and useful for overall system management.

As an example, a received optical power signal with 40 dBm dynamic range can be reported as an N-bit digital result, where N is determined by the required measurement resolution. For example, if optical power monitoring having an accuracy of one percent is required for a 40 dBm input signal range of optical signal 104, then a 7-bit result accurate to one LSB or 0.4 dBm is sufficient. Thus, the LSB value or resolution of the digital result (i.e., of the digital output code ($D_{OUT}$)) would be 0.3125 dBm for A/D converter 112 of seven bits (N=7).

Figure 3A:
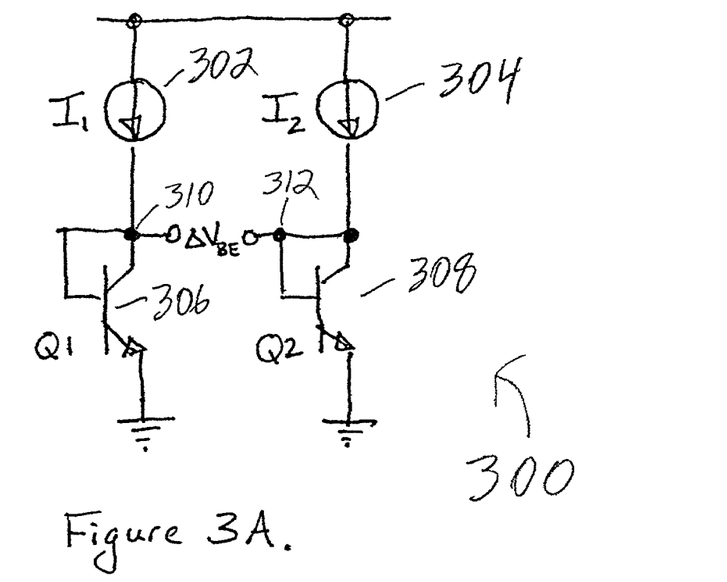
FIG. 3A shows an exemplary linear-to-logarithmic conversion circuit in accordance with an embodiment of the present invention.
Figure 3B:
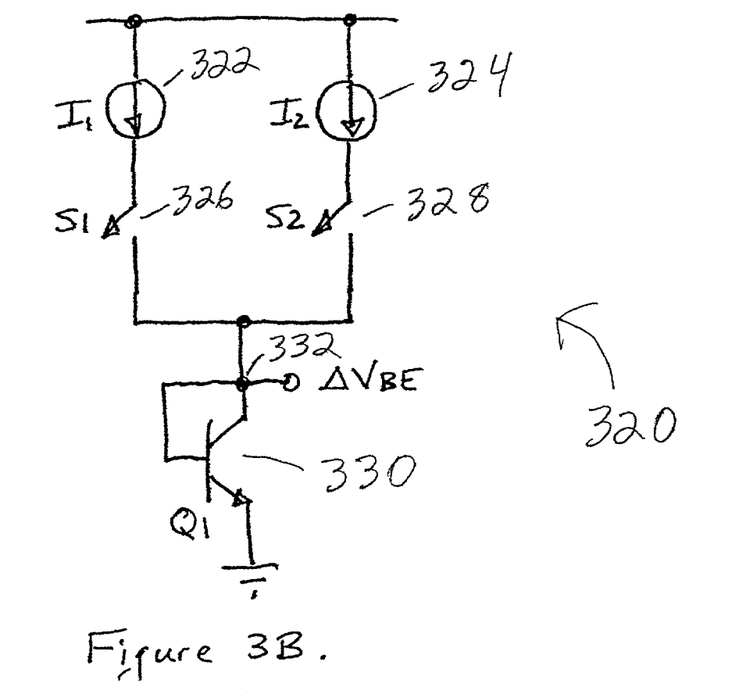
FIG. 3B shows another exemplary linear-to-logarithmic conversion circuit in accordance with an embodiment of the present invention.

Accurate linear-to-logarithmic voltage conversion can be accomplished with a pair of matched bipolar transistors or with a single bipolar transistor and switched current sources as shown in FIGS. 3A and 3B, respectively. FIG. 3A shows an exemplary circuit 300, which performs a linear-to-logarithmic conversion in accordance with an embodiment of the present invention. Circuit 300 includes current sources 302 and 304 and matched bipolar transistors 306 and 308 (labeled $Q_1$ and $Q_2$, respectively). Current sources 302 and 304 provide corresponding currents $I_1$ and $I_2$ through transistors 306 and 308, respectively.

FIG. 3B shows an exemplary circuit 320, which performs a linear-to-logarithmic conversion in accordance with an embodiment of the present invention. Circuit 320 includes current sources 322 and 324, switches 326 and 328 (labeled $S_1$ and $S_2$, respectively), and a transistor 330 (labeled $Q_1$). Current sources 322 and 324 provide corresponding currents $I_1$ and $I_2$, with the current $I_1$ passing through transistor 330 when switch 326 is closed and the current $I_2$ passing through transistor 330 when switch 328 is closed.

Figure 4:
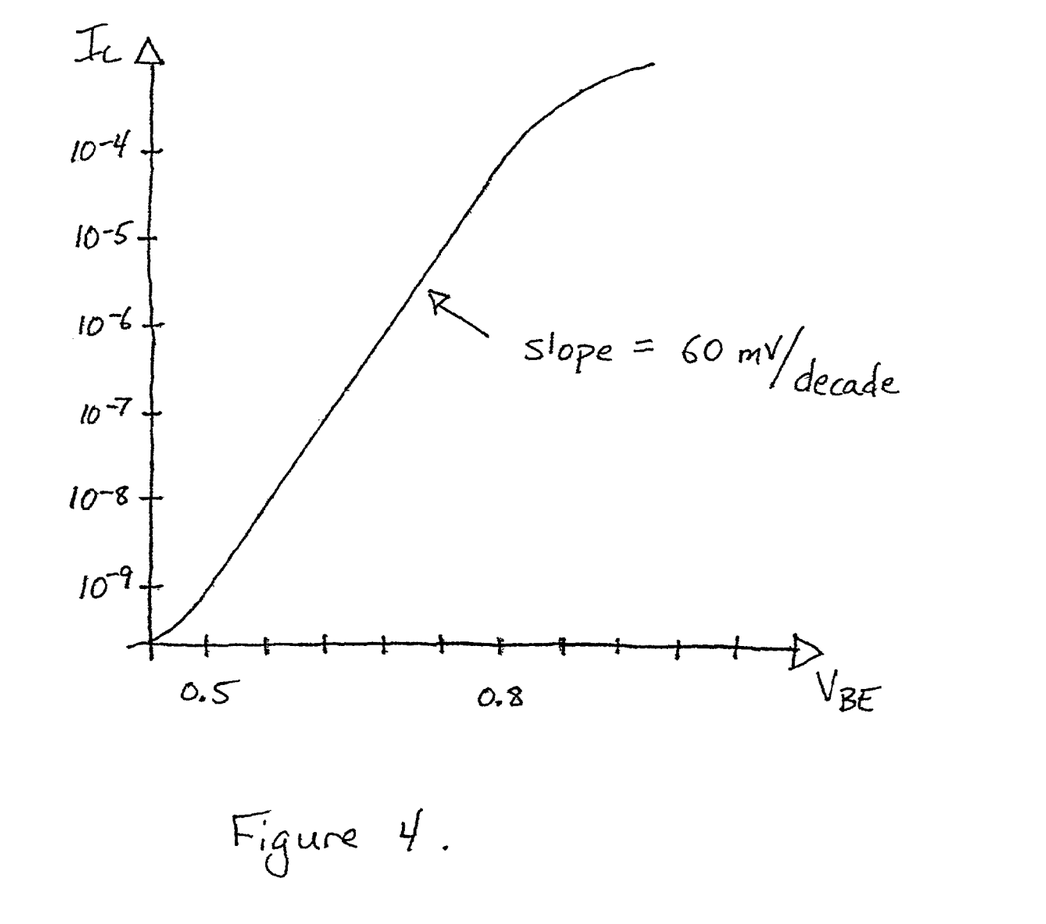
FIG. 4 shows a plot of current versus voltage in accordance with an embodiment of the present invention.

FIGS. 3A and 3B provide a linear-to-logarithmic conversion due to a natural logarithmic relationship that exists between a transistor's base-emitter (or emitter-base) voltage ($V_{BE}$) and the transistor's collector current ($I_C$), as illustrated in FIG. 4. It should be understood that transistors 306, 308, and 330 could each be replaced by a diode to accomplish the same linear-to-logarithmic conversion, as discussed herein in reference to FIGS. 3A and 3B. Thus, discussions herein regarding a transistor's base-emitter voltage ($V_{BE}$) and collector current ($I_C$) would apply also to a diode (e.g., a P-N junction diode) and correspond to a diode's forward biased voltage drop and current, respectively.

FIG. 4 shows a semi-log plot of collector current ($I_C$) on a log scale versus base-emitter voltage ($V_{BE}$) on a linear scale in accordance with an embodiment of the present invention. As indicated by the slope notation in FIG. 4, the transistor's base-emitter voltage ($V_{BE}$) provides a very predictable and linear response of approximately 60 mV/decade over several decades of collector current. The governing equation for this response is as follows:

$$\Delta V_{BE}=(n \cdot K \cdot T/q) \cdot \ln(I_1/I_2) \quad (1)$$

where n is a diode voltage ideality factor, K is Boltzmann's constant, T is absolute temperature in Kelvin, q is the electron charge, and $I_1$ and $I_2$ are the collector currents that produce a base-emitter (or emitter-base) voltage potential difference ($\Delta V_{BE}$).

The base-emitter voltage potential difference ($\Delta V_{BE}$) of equation (1) is shown in FIGS. 3A and 3B. In FIG. 3A, it is measured across nodes 310 and 312, which join the collector and base terminals of transistors 306 and 308, respectively. In FIG. 3B, it is measured at a node 332 while switch 326 is closed and switch 328 is open and then when switch 326 is open and switch 328 is closed to obtain the base-emitter voltage potential difference ($\Delta V_{BE}$).

The collector currents $I_1$ and $I_2$ in equation (1) can be designed to be proportional to the direct current voltage signal ($V_{DC}$), from amplifier 108, and a voltage reference signal ($V_{REF}$), respectively. The resulting transfer function equation obtained for logarithmic optical power monitoring is as follows:

$$\Delta V_{BE}=(n \cdot K \cdot T/q) \cdot \ln(V_{DC}/V_{REF}) \quad (2)$$

or in general terms by the following equation:

$$\Delta V_{BE}=C \cdot \log_{10}(V_{DC}/V_{REF}) \quad (3)$$

where $C=2.3 \cdot n \cdot K \cdot T/q$ and with the natural logarithm replaced with the equivalent base 10 logarithm (i.e., $\ln(x) = 2.3 \cdot \log_{10}(x)$).

As discussed herein, the change in the voltage potential is measured relative to a reference current (e.g., $I_2$) or reference voltage (e.g., $V_{REF}$). Consequently, differences in semiconductor processing variations from device to device or other factors, such as temperature variations for example, do not adversely affect the measurement or are subtracted out. It should be understood, however, that the equations could be modified such that a measurement of the reference voltage or current is not required or is required only periodically or when a change in circumstances are detected that may affect the reference value.

Figure 5:
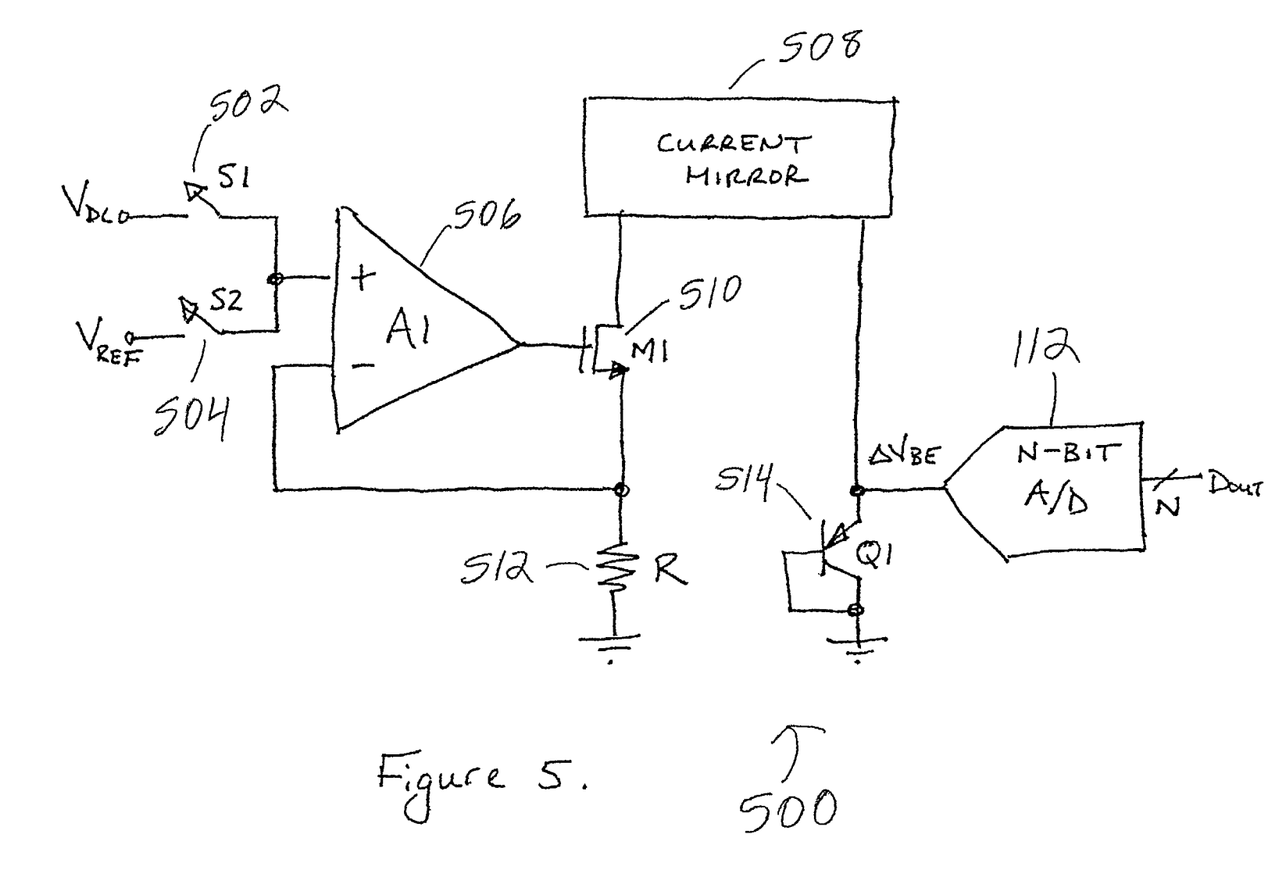
FIG. 5 shows an exemplary circuit for a portion of the fiber optics receiver circuit of FIG. 2.

FIG. 5 shows an exemplary circuit 500 for linear-to-logarithmic voltage converter 202 of FIG. 2. Circuit 500 performs a linear-to-logarithmic voltage conversion and includes switches 502 and 504 (labeled $S_1$ and $S_2$, respectively), an amplifier 506 (labeled A1 and which may represent, for example, an operational amplifier), a current mirror 508, transistors 510 and 514, a resistor (R) 512, and A/D converter 112. Switch 502 receives the direct current voltage signal ($V_{DC}$) and switch 504 receives the voltage reference signal ($V_{REF}$).

In terms of general operation for circuit 500, when switch 502 is closed and switch 504 is open, transistor 514 is biased with a current value proportional to the direct current voltage signal ($V_{DC}$) divided by resistor 512 (i.e., $V_{DC}/R$). When switch 502 is open and switch 504 is closed, transistor 514 is biased with a current value proportional to the voltage reference signal ($V_{REF}$) divided by resistor 512 (i.e., $V_{REF}/R$). Note that in general switches 502 and 504 would not both remain open or closed for any extended period of time and that during operation, one switch would be toggled open while the other would be toggled closed. Therefore, the change in the emitter-base voltage ($V_{BE}$) of transistor 514 that results from the toggling of switches 502 and 504 satisfies equation (2) described above and produces the emitter-base voltage potential difference ($\Delta V_{BE}$).

A/D converter 112 quantizes the difference in the emitter-base voltage ($V_{BE}$) of transistor 514 to produce the digital output code ($D_{OUT}$) of N-bits, which is proportional to the relative strength of the received optical power signal (i.e., optical signal 104). Thus, A/D converter 112 measures the emitter-base voltage ($V_{BE}$) of transistor 514 when switch 502 is closed and then when switch 504 is closed (with switch 502 open) and performs an A/D conversion on the difference in values of the two measurements (i.e., the emitter-base voltage potential difference ($\Delta V_{BE}$)). In general, A/D converter 112 is timed to perform its measurements after transients, for example due to switches 502, 504 making or breaking contact, have settled. It should also be understood that various techniques for switching between the direct current voltage signal ($V_{DC}$) and the voltage reference signal ($V_{REF}$) are possible in accordance with the principles of the present invention.

Additional signal processing can be applied to provide appropriate scale, gain, and offset adjustments. These adjustments can be made in hardware either before or after the A/D conversion by A/D converter 112 or in software after the digital output code ($D_{OUT}$) (i.e., the digital results) is acquired from A/D converter 112.

Transistor 510 represents an n-type field-effect transistor and transistor 514 represents a PNP bipolar junction transistor. Circuit 500 can be implemented in standard digital CMOS (complementary metal-oxide semiconductor) technology without the need for any special processing or electrical trimming to achieve better than one percent accuracy. Transistor 514 can be realized in a standard digital CMOS process by utilizing the parasitic vertical PNP device, which is formed by the PMOS source/drain diffusion, n-well, and substrate for the PNP's emitter, base, and collector terminals, respectively.

Figure 6:
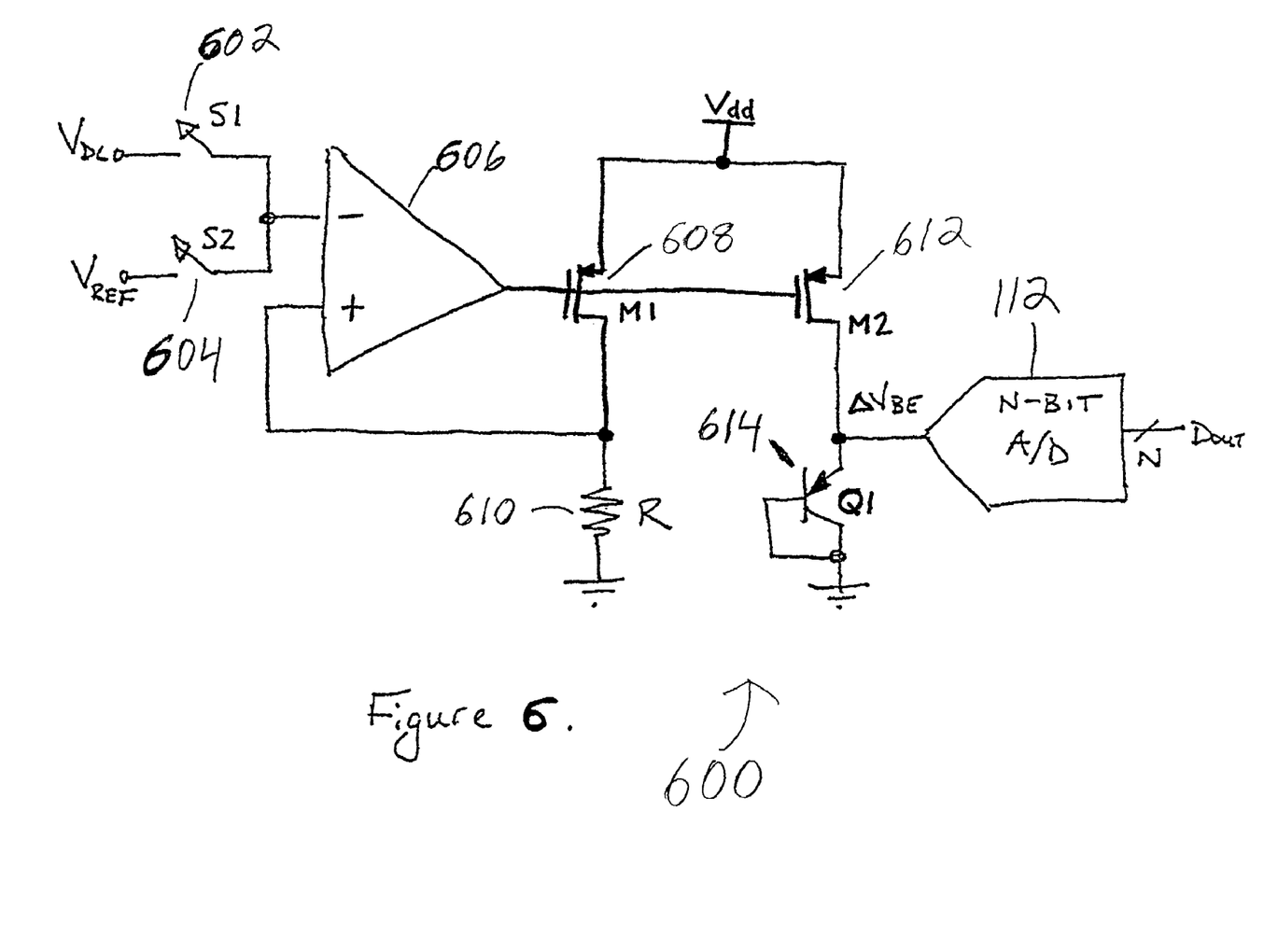
FIG. 6 shows an exemplary circuit for a portion of the fiber optics receiver circuit of FIG. 2.

FIG. 6 shows an exemplary circuit 600 for linear-to-logarithmic voltage converter 202 of FIG. 2. Circuit 600 performs a linear-to-logarithmic voltage conversion and includes switches 602 and 604 (labeled $S_1$ and $S_2$, respectively), an amplifier 606, transistors 608, 612, and 614, a resistor 610 (labeled R), and A/D converter 112. Switch 602 receives the direct current voltage signal ($V_{DC}$) and switch 604 receives the voltage reference signal ($V_{REF}$).

Transistors 608 and 612 are p-type transistors (e.g., PMOS devices) and have their source terminals coupled to a supply voltage ($V_{dd}$) and their gate terminals coupled to the output of amplifier 606. In general, the current through transistor 612 (labeled M2) is proportional to the current through transistor 608 (labeled M1). When switch 602 is closed and switch 604 is open, the current through transistor 608 is equal to the direct current voltage signal ($V_{DC}$) divided by resistor 610 (i.e., $V_{DC}/R$). When switch 602 is open and switch 604 is closed, the current through transistor 608 is equal to the voltage reference signal ($V_{REF}$) divided by resistor 610 (i.e., $V_{REF}/R$).

The change in the emitter-base voltage ($V_{BE}$) of transistor 614 that results from the toggling of switches 602 and 604 satisfies equation (2) described above and produces the emitter-base voltage potential difference ($\Delta V_{BE}$). A/D converter 112 then quantizes the difference in the emitter-base voltage ($V_{BE}$) of transistor 614 to produce the digital output code ($D_{OUT}$) of N-bits, as explained above.

It should be understood that FIGS. 2 through 6 are exemplary circuits for performing an integrated logarithmic optical power measurement and that many other circuit arrangements in accordance with the principles of the present invention can be implemented. For example, various circuit arrangements can be designed to implement the general transfer functions of the equations herein (e.g., equations (2) and (3)). Furthermore, software may be utilized to perform one or more of the hardware operations described herein, such as with the use of look-up tables for example.

Additionally, the systems and methods discussed herein have application for not only a single optical signal, but for measurement of optical power of many optical signals, such as with wavelength division multiplexing or dense wavelength division multiplexing. For example, a digital result can be obtained for each of the received optical signals by application of the techniques discussed herein.

Embodiments described above illustrate but do not limit the invention. It should also be understood that numerous modifications and variations are possible in accordance with the principles of the present invention. Accordingly, the scope of the invention is defined only by the following claims.

We claim:

1. A receiver comprising:
   a photodiode that translates an optical signal into an electrical signal;
   a first amplifier, coupled to the photodiode, that receives the electrical signal and provides a first signal;
   a converter, coupled to the first amplifier, that performs a linear-to-logarithmic conversion of the first signal to provide an output signal; and
   an analog-to-digital converter that converts the output signal to a digital output signal
   wherein the converter provides the output signal, represented by $\Delta V_{BE}$, having a value defined by at least one of the following equations, $$\Delta V_{BE} = (n \cdot K \cdot T/q) \cdot \ln(I_1/I_2)$$

$$\Delta V_{BE} = (n \cdot K \cdot T/q) \cdot \ln(V_{DC}/V_{REF})$$

$$\Delta V_{BE} = C \cdot \log_{10}(V_{DC}/V_{REF}), \text{ with } C = 2.3 \cdot n \cdot K \cdot T/q \text{ and}$$

where $I_1$, $I_2$ and $V_{DC}$, $V_{REF}$ are values of current flowing through and voltage at a terminal, respectively, of at least one of a transistor and a diode, and
   wherein the analog-to-digital converter provides the digital output signal, which is based on a difference in the measurement of the output signal when $I_1$ or $V_{DC}$ is applied and then when $I_2$ or $V_{REF}$ is applied.

2. The receiver of claim 1, wherein the first amplifier provides a current to voltage conversion with a voltage level that is proportional to the average optical power received by the photodiode.

3. The receiver of claim 1, further comprising a second amplifier, coupled to the photodiode, which converts the electrical signal into a second signal that contains a data stream.

4. The receiver of claim 3, wherein the first amplifier and the second amplifier are operational amplifiers.

5. The receiver of claim 1, further comprising an optical fiber coupled to the photodiode and providing the optical signal.

6. The receiver of claim 1, wherein the converter performs the linear-to-logarithmic conversion by utilizing the logarithmic relationship between a base-emitter voltage and a collector current of a transistor.

7. The receiver of claim 1, wherein the converter performs the linear-to-logarithmic conversion by utilizing the logarithmic relationship of a voltage and a current of a diode.

8. The receiver of claim 1, wherein the first signal is a direct current voltage signal that is proportional to an average power of the electrical signal.

9. A receiver comprising:
   a photodiode that translates an optical signal into an electrical signal;
   a first amplifier, coupled to the photodiode, that receives the electrical signal and provides a first signal;
   a converter, coupled to the first amplifier, that performs a linear-to-logarithmic conversion of the first signal to provide an output signal; and
   an analog-to-digital converter that converts the output signal to a digital output signal,
   wherein the converter comprises:
   a second amplifier that receives the first signal and a reference signal and provides alternatively a second signal corresponding to the first signal and a third signal corresponding to the reference signal;

a first transistor coupled to the second amplifier;

a resistor coupled to the first transistor and to the second amplifier;

a second transistor;

a current mirror coupled to the first transistor and to the second transistor, the current mirror providing a current through the second transistor having a value of the first signal divided by the value of the resistor, when the second amplifier provides the second signal, and the reference signal divided by the value of the resistor when the second amplifier provides the third signal to provide the output signal which is a difference in values at a terminal of the second transistor determined by the first signal and the reference signal.

10. A receiver comprising:

a photodiode that translates an optical signal into an electrical signal;

a first amplifier, coupled to the photodiode, that receives the electrical signal and provides a first signal;

a converter, coupled to the first amplifier, that performs a linear-to-logarithmic conversion of the first signal to provide an output signal; and an analog-to-digital converter that converts the output signal to a digital output signal;

wherein the converter comprises:

a second amplifier that receives the first signal and a reference signal and provides alternatively a second signal corresponding to the first signal and a third signal corresponding to the reference signal;

a first transistor coupled to the second amplifier;

a resistor coupled to the first transistor and to the second amplifier;

a second transistor coupled to the first transistor; and a third transistor coupled to the second transistor, wherein the current through the third transistor is proportional to a value of the first signal divided by the value of the resistor, when the second amplifier provides the second signal, and to a value of the reference signal divided by the value of the resistor when the second amplifier provides the third signal to provide the output signal which is a difference in values at a terminal of the second transistor determined by the first signal and the reference signal.

* * * * *